Sept. 2, 1958        R. C. BARKER        2,849,994

EXCESS BREATHER OIL RECOVERY SYSTEM

Filed May 29, 1956

INVENTOR.
RAY C. BARKER
BY
*Philip S. McBean*
ATTORNEY

# 2,849,994

EXCESS BREATHER OIL RECOVERY SYSTEM

Ray C. Barker, Wichita, Kans.

Application May 29, 1956, Serial No. 587,981

4 Claims. (Cl. 123—41.86)

The invention herein disclosed relates to the recovery of excess oil appearing in the breather lines of aircraft engines.

This excess oil is usually lost and in escaping, frequently covers external surfaces or possibly clouds windshields and is otherwise objectionable.

Objects of the present invention are to eliminate these objectionable features, that is to extract excess oil from the breather air, to make use of and return this oil to the engine and to prevent throwing of excess oil on external parts of the aircraft.

Further objects of the invention are to accomplish these purposes with simple, practical low-cost instrumentalities, which may be readily combined with present breather and vacuum systems and which will be entirely fail-safe in character.

The foregoing and other desirable objects are attained by the novel features of construction, combination and relation of parts illustrated and hereinafter described and claimed.

The drawing accompanying and forming part of the specification, illustrates a present practical embodiment of the invention, but structure may be modified and changed as regards this illustration, all within the true intent and scope of the invention as hereinafter defined and claimed.

Fig. 1 in the drawing is a diagrammatic view of a typical aircraft engine lay-out, showing the invention incorporated therein and in particular, the breather separator cut in on the breather line and connected by a scavenging line with a drain oil separator cut in on the suction side of the vacuum system.

Figure 1:
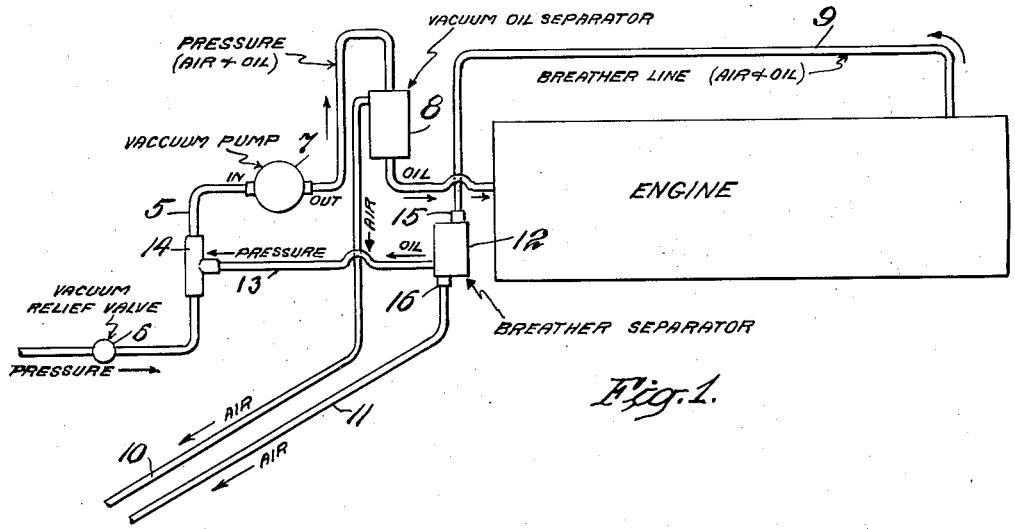

In the system shown in Fig. 1, oil taken from the breather line 9 is returned to the engine through a line 5, having a vacuum relief valve 6, vacuum pump 7, and vacuum oil separator 8, incorporated therein.

The vacuum oil separator has an air escape line 10, leading to atmosphere and a similar air escape line 11, is provided for the breather.

The breather line 9 extending from the crank case or engine lubricating system to atmosphere is interrupted or blocked by a special breather oil separator 12, connected by a line 13, to drain the excess oil extracted from the breather air back to the suction side of the vacuum pump.

The drain or scavenging connection is made through the medium of a special drain oil separator 14, properly orificed to take out the oil without withdrawing excess air.

Figure 2:
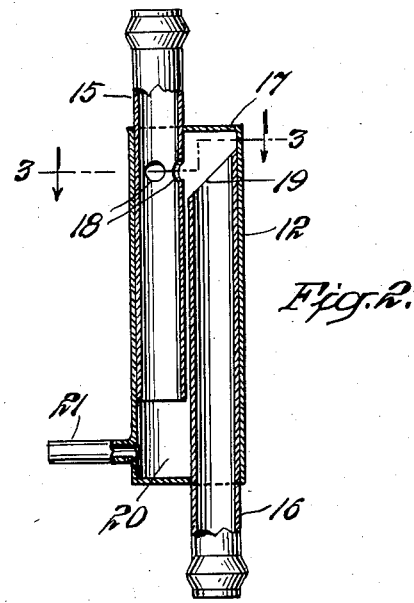
Fig. 2 is an enlarged broken longitudinal sectional view of the breather oil separator.
Figure 3:
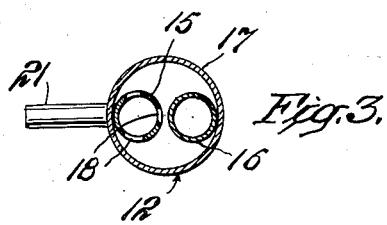
Fig. 3 is a cross-sectional detail as on line 3—3 of Fig. 2.

The breather separator 12, may be simply constructed as shown in Figs. 2 and 3, with two sections of tubing 15, 16, arranged in overlapping end relation within an enclosing cylindrical casing 17.

The upper tube 15, is connected at the top with the breather line 9, and the lower tube 16, is connected at the bottom with the air vent line 11.

The ends of the tubes are open, the upper tube has vent openings 18, in the sides of the same at a level above the open upper end of the second tube and this end is shown as slanted or inclined at 19, toward these vent openings to facilitate entry of air from the side openings in the upper tube into the upper end of the lower tube.

As a result, breather air is free to escape from tube 15, into chamber 17, out the lower end and out through vents 18 at the level of the upper end of the downwardly extending tube and this air is free to circulate and expand within this chamber and to deposit entrained oil to leave it in the sump portion 20, at the bottom of the chamber.

An outlet 21, in the side of the sump is connected with scavenging line 13.

Vents 18, in the upper portion of tube 15, are of sufficient size to provide free escape of air if oil in the sump should rise to the level of the lower end of this tube.

Figure 4:
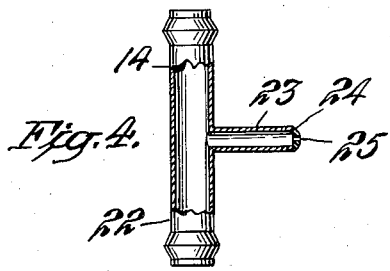
Fig. 4 is a broken part longitudinal sectional view of the orificed drain oil separator.

The separator connection 14, may be constructed as shown in Fig. 4, as a length of tubing 22, adapted to be connected at its upper and lower ends in the suction line 5, of the vacuum pump and having a smaller inlet tube 23, in the side of the same for connection with the drain or scavenging line 13.

A special feature of this side tube is that it is used as an orifice mount, it being shown closed by a plug 24, having a small orifice 25, therein.

The size of this orifice is such as to pass oil extracted from breather air without admitting excess air into the suction line.

By way of example, an orifice of .061 to .062" has been found to meet requirements for the breather system in a Beech Aircraft Corporation Bonanza airplane of current design.

The invention can be readily incorporated in the breather systems of modern aircraft engines by interposing the drain connection unit 14, in the suction line leading to the vacuum pump and by interposing the breather separator 12, in the breather line and connecting the scavenging line 13, to the orifice tube 23, of the drain fitting.

In this arrangement, breather air from the engine is subjected to oil separation, denuded air freed of excess oil is vented to atmosphere and oil extracted from the breather air is collected and returned to the suction side of the vacuum pump controlled by the orifice to prevent admission of excess air into the suction line.

The system is completely fail-safe, for the upright drain connection 14 will continue to admit air to the vacuum pump even if the control orifice or scavenging line gets out-of-order and similarly the breather will continue to function, even if excess breather oil scavenging fails to function.

The invention, in addition to conserving oil and aiding continuous engine lubrication, avoids the fouling of external aircraft surfaces by breather air vented from the engine.

The parts required to install the system are of simple low-cost construction and there are no moving parts to get out-of-order. The size of the control orifice may be judged from the example given and from experience with any usual lubricating system, since the only practical requirement is that the restriction in the scavenging line be such as to hold back a column of oil from the vacuum pump, which will feed as it collects, into the air intake line, while sealing off and preventing intake of excess air from the breather through this line. The location of the control orifice at the lower end of the scavenging connection, preferably at the drain fitting as illustrated, assures the maintenance of a sufficient length of oil column for adequate liquid seal purposes.

In operation of the system, the vacuum pump 7, which is essentially an air pump, creates the vacuum necessary for operation of navigational or other instruments (not shown) which are connected with line 5.

From the foregoing, it will be realized that the invention makes use of the vacuum system presently utilized for operation of various air driven instrumentalities (not shown) for reclaiming excess oil present in the breather air of the engine.

The vacuum pump 7, which is essentially an air pump draws in air through line 5 to which such air driven instrumentalities are connected. Vacuum relief valve 6 is interposed in this air induction line as a protection for the instruments allowing outside air to bleed into the vacuum system in the event of excess suction being created by the vacuum pump, these instruments being designed for operation within specified limits of suction.

Vacuum oil separator 8 may be a conventional oil separator designed to remove excessive amounts of oil escaping from the vacuum pump lubrication system. In an installation without breather separator 12, there might be no oil in line 5 and hence no need for vacuum oil separator 8. In the present invention, however, where vacuum pump 7 is utilized to extract oil from the pressure separator 12, this vacuum oil separator 8 serves the useful purpose of releasing oil from the breather side of the vacuum pump and returning such oil to the engine circulation system and releasing air freed of such oil to atmosphere.

What is claimed is:

1. Excess breather oil recovery system for aircraft in which there is an engine having a breather extending from the engine lubricating system to atmosphere and a vacuum system having an air pump, said recovery syster comprising the combination of engine breather line, an excess breather oil separator connected to said breather line and having separate air and oil discharge outlets, a drain connection extending from said oil discharge outlet to the suction side of said vacuum pump, and a vacuum oil separator connected with the discharge side of said vacuum pump and having an air discharge outlet and an oil discharge outlet, said oil discharge outlet being connected to return excess oil collected from the breather air back to the engine lubricating system.

2. The invention according to claim 1, with a flow restricting control orifice in said oil line extending from the excess breather oil separator to the suction side of the vacuum pump.

3. The invention according to claim 1, in which said excess breather oil separator comprises open ended upright upper and lower open-ended tubular members in overlapping end relation within a closed chamber having an oil collecting sump at the lower end and in which said breather line is connected with the upper end of said upper tubular member and said air discharge outlet is connected with the lower end of said lower tubular member and said oil discharge outlet extends from said oil collecting sump.

4. The invention according to claim 3, in which the upper end of the lower tubular member is inclined toward the upper tubular member and said upper tubular member has air vent openings adjoining said inclined upper end of the lower tubular member.

References Cited in the file of this patent

UNITED STATES PATENTS

| | | |
|---|---|---|
| 2,024,336 | Cavanaugh | Dec. 17, 1935 |
| 2,268,653 | Flowers | Jan. 6, 1942 |
| 2,417,747 | Flowers | Mar. 18, 1947 |
| 2,432,130 | Serrell | Dec. 9, 1947 |
| 2,725,956 | Cunningham | Dec. 6, 1955 |